United States Patent
Park (10) Patent No.: US 8,761,668 B2
(45) Date of Patent: Jun. 24, 2014

(54) METHOD OF PERFORMING OPERATION RELATED TO OTHER DEVICE VIA NEAR FIELD COMMUNICATION AND APPARATUS THEREFOR

(75) Inventor: Jeong-hun Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1352 days.

(21) Appl. No.: 12/118,837

(22) Filed: May 12, 2008

(65) Prior Publication Data

US 2009/0093214 A1    Apr. 9, 2009

(30) Foreign Application Priority Data

Oct. 9, 2007 (KR) .......................... 10-2007-0101684

(51) Int. Cl.
*H04B 7/00* (2006.01)

(52) U.S. Cl.
USPC .......................... 455/41.2; 455/421; 455/41.3

(58) Field of Classification Search
USPC .................. 455/41.2, 421, 41.3, 456.1, 456.3
See application file for complete search history.

(56) References Cited

U.S. PATENT DOCUMENTS

| | | | |
|---|---|---|---|
| 7,058,405 B2 | 6/2006 | Chandra et al. | |
| 7,076,210 B2 * | 7/2006 | Sasai et al. | 455/41.2 |
| 7,099,627 B2 * | 8/2006 | Turner et al. | 455/67.11 |
| 7,196,662 B2 * | 3/2007 | Misikangas et al. | 342/451 |
| 7,233,286 B2 | 6/2007 | Krumm et al. | |
| 7,480,511 B2 * | 1/2009 | O'Meagher | 455/456.1 |
| 8,082,347 B2 * | 12/2011 | Abdelhamid et al. | 709/227 |
| 2004/0203374 A1 * | 10/2004 | Zilliacus | 455/41.2 |
| 2004/0203698 A1 * | 10/2004 | Comp | 455/421 |
| 2005/0181779 A1 * | 8/2005 | Jones et al. | 455/421 |
| 2005/0202782 A1 * | 9/2005 | Sasai et al. | 455/41.2 |
| 2006/0014547 A1 * | 1/2006 | Walter | 455/456.1 |
| 2006/0046709 A1 | 3/2006 | Krumm et al. | |
| 2006/0119516 A1 * | 6/2006 | Krumm et al. | 342/451 |
| 2006/0229014 A1 | 10/2006 | Harada et al. | |
| 2007/0066223 A1 * | 3/2007 | D'Hont et al. | 455/41.2 |
| 2008/0005351 A1 * | 1/2008 | Neugebauer et al. | 709/238 |
| 2008/0036647 A1 * | 2/2008 | Jung | 342/118 |
| 2008/0061937 A1 * | 3/2008 | Park | 340/10.1 |

(Continued)

FOREIGN PATENT DOCUMENTS

| | | |
|---|---|---|
| KR | 2004-92414 | 11/2004 |
| KR | 2005-96196 | 10/2005 |

(Continued)

OTHER PUBLICATIONS

Korean Office Action mailed May 22, 2012 issued in corresponding Korean Patent Application No. 10-2007-0101684.

(Continued)

*Primary Examiner* — Lewis West
(74) *Attorney, Agent, or Firm* — Staas & Halsey LLP (57) ABSTRACT

A method of performing an operation related to a second device, performed by a first device, via near field wireless communication, and an apparatus therefore. When a signal for wireless communication is received from the second device, the method includes calibrating the strength of the received signal; comparing the strength of the calibrated signal with operation signal information that is a result of calibrating a range of strengths of signals which are for the wireless communication and which are received from the second device moving between a plurality of points set to be within a predetermined distance from the first device; and as a result of the comparison, selectively performing the operation related to the second device.

22 Claims, 4 Drawing Sheets

(56) References Cited

U.S. PATENT DOCUMENTS

2008/0280653 A1* 11/2008 Ma et al. .................. 455/569.1
2010/0026508 A1* 2/2010 Krapf et al. ............... 340/686.6

FOREIGN PATENT DOCUMENTS

| KR | 2006-47806 | 5/2006 |
| KR | 10-2006-0108207 | 10/2006 |
| KR | 10-2007-0006958 | 1/2007 |

OTHER PUBLICATIONS

Korean Notice of Allowance issued Nov. 20, 2013 in corresponding Korean Patent Application No. 10-2007-0101684.

* cited by examiner

| BOUNDARY POINT<br>DEVICE TYPE | A | B | C | D | E |
|---|---|---|---|---|---|
| DEVICE X | 3~5 | 3~4 | 4~6 | 6~7 | 5~7 |
| DEVICE Y | 5~7 | 5~8 | 6~9 | 7~8 | 5~7 |
| DEVICE Z | 1~3 | 1~2 | 2~3 | 1~3 | 3~4 |

METHOD OF PERFORMING OPERATION RELATED TO OTHER DEVICE VIA NEAR FIELD COMMUNICATION AND APPARATUS THEREFOR

CROSS-REFERENCE TO RELATED APPLICATION

This application claims the benefit of Korean Patent Application No. 2007-101684, filed in the Korean Intellectual Property Office on Oct. 9, 2007, the disclosure of which is incorporated herein by reference.

BACKGROUND OF THE INVENTION

1. Field of the Invention

Aspects of the present invention relate to a method of performing an operation related to a second device, performed by a first device, via near field communication and an apparatus thereof.

2. Description of the Related Art

Figure 1:
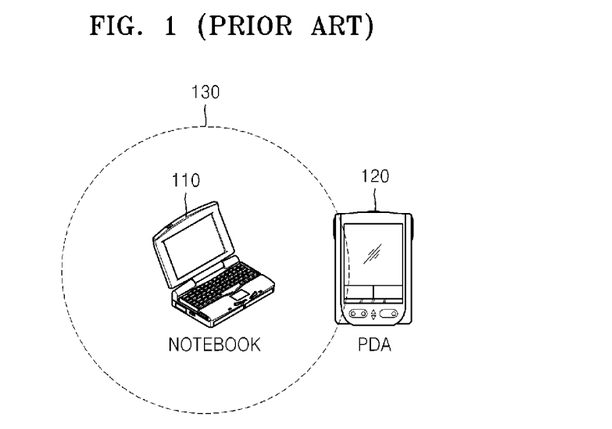
FIG. 1 is a diagram illustrating a communication method between conventional devices which support a Bluetooth function.

Many products supporting such near field communication technologies as Bluetooth and Wi-Fi have been developed. FIG. 1 shows a communication method between conventional devices supporting a Bluetooth function. A personal digital assistant (PDA) 120 supporting the Bluetooth function is within a predetermined distance from a notebook 110 having installed therein a Bluetooth module.

The notebook 110 checks whether there are other devices in a communication enabled zone 130 in which Bluetooth communication is enabled. When the notebook 110 detects that the PDA 120, which is a device supporting the Bluetooth function, has entered the communication enabled zone 130, the notebook 110 attempts to connect with the detected PDA 120. As a result of the connection attempt by the notebook 110, when the connection between the notebook 110 and the PDA 120 is generated, data can be mutually exchanged thereafter via wireless communication.

According to other conventional near field communication techniques, when the notebook 110 detects the PDA 120, an operation related to the detected PDA 120 may be performed. For example, when the notebook 110 detects the PDA 120, an operation for synchronizing databases stored in the PDA 120 and the notebook 110 may be performed.

However, if a predetermined operation is unconditionally performed when another device is detected in the communication enabled zone 130, there may be a problem since the predetermined operation may not be desired by a user. The problem becomes serious where the predetermined operation involves an important operation, such as data deletion.

In this manner, when an operation related to another device is automatically performed, conventional near field communication technology has a problem in that the conventional technology cannot take into account a user's intentions.

SUMMARY OF THE INVENTION

Aspects of the present invention provide a method of performing an operation related to another device via near field communication and an apparatus therefor that enable the operation to be selectively performed, based on a user's intentions, when the operation related to the other device supporting a near field communication function is performed.

According to an aspect of the present invention, a method of performing an operation related to a second device, performed by a first device, via near field wireless communication is provided. The method includes calibrating a strength of the received signal when a signal for wireless communication is received from the second device; comparing the strength of the calibrated signal with operation signal information that is a result of calibrating a range of strengths of signals which are for the wireless communication and which are received from the second device moving between a plurality of points set to be within a predetermined distance from the first device; and selectively performing the operation related to the second device, based on a result of the comparison.

According to another aspect of the present invention, the method further includes updating the operation signal information. The updating of the operation signal information may include storing a range of strength of the signal, which is for the wireless communication and which is received from the second device, as a sample while performing the operation; and when the number of the stored sample exceeds a predetermined number, updating the operation signal information using the ranges of the strengths of the signals in the samples.

According to another aspect of the present invention, when a ratio of a number of samples having a range greater than the range of the strengths of the signals included in the operation signal information to a total number of the stored sample exceeds a predetermined ratio, the updating of the operation signal information includes expanding the range of the strengths of the signals in the operation signal information using the range of strength of a signal in the samples.

According to another aspect of the present invention, when a ratio of a number of samples having a range smaller than the range of the strengths of the signals in the operation signal information to a total number of the stored sample exceeds a predetermined ratio, the updating of the operation signal information includes the reducing the range of the strengths of the signals in the operation signal information using the range of strength of a signal in the samples.

According to another aspect of the present invention, the method further includes generating the operation signal information, wherein the generating of the operation signal information includes outputting an instructing message to generate the operation signal information using at least one of a text signal, a video signal, and/or an audio signal; receiving a signal for wireless communication from the second device moving between each of a plurality of points corresponding to the output instructing message; and generating the operation signal information using a range of strength of the received signal.

According to another aspect of the present invention, the plurality of points are determined according to a user's intentions.

According to another aspect of the present invention, the operation signal information further includes information regarding a type of the second device which has transmitted the signal, and the operation signal information is generated using ranges of strength of signals received from different types of the second device moving between each of the plurality of points.

According to another aspect of the present invention, the selective performing of the operation includes performing the operation when the strength of the calibrated signal is within the range of the strengths of the signals in the operation signal information, and the operation includes at least one of content reception/transmission, content output, and/or data synchronization.

According to another aspect of the present invention, the signal for the wireless communication is a Bluetooth signal or a Wireless Fidelity (Wi-Fi) signal.

According to another aspect of the present invention, an apparatus for performing an operation related to a second device, performed by a first device, via near field wireless communication, is provided. The apparatus includes a receiving unit to receive a signal for wireless communication from the second device; a calibration unit to calibrate a strength of the received signal; a comparison unit to compare the strength of the calibrated signal with operation signal information that is a result of calibrating a range of strengths of signals which are for the wireless communication and which are received from the second device moving between each of a plurality of points set to be within a predetermined distance from the first device; and an operation performing unit to selectively perform the operation related to the second device, based on a result of the comparison.

According to another aspect of the present invention, the apparatus further includes an update unit to update the operation signal information. The update unit may store a range of strength of the signal, which is for the wireless communication and which is received from the second device, as a sample while the operation is performed, and when the number of the stored sample exceeds a predetermined number, may update the operation signal information using the ranges of the strength of the signals in the samples.

According to another aspect of the present invention, the apparatus further includes an information generation unit to generate the operation signal information, and the information generation unit includes an output unit to output an instructing message to generate the operation signal information using at least one of a text signal, a video signal, and/or an audio signal; and a generation unit to generate the operation signal information using a range of strength of a received signal when the receiving unit receives the signal for wireless communication from the second device moving between each of a plurality of points corresponding to the output instructing message.

According to another aspect of the present invention, a computer readable recording medium having recorded thereon a program to executing a method of performing an operation related to a second device, performed by a first device, via near field wireless communication, The method includes calibrating a strength of the received signal when a signal for wireless communication is received from the second device; comparing the strength of the calibrated signal with operation signal information that is a result of calibrating a range of strengths of signals which are for the wireless communication and which are received from the second device moving between a plurality of points set to be within a predetermined distance from the first device; and selectively performing the operation related to the second device, based on a result of the comparison.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
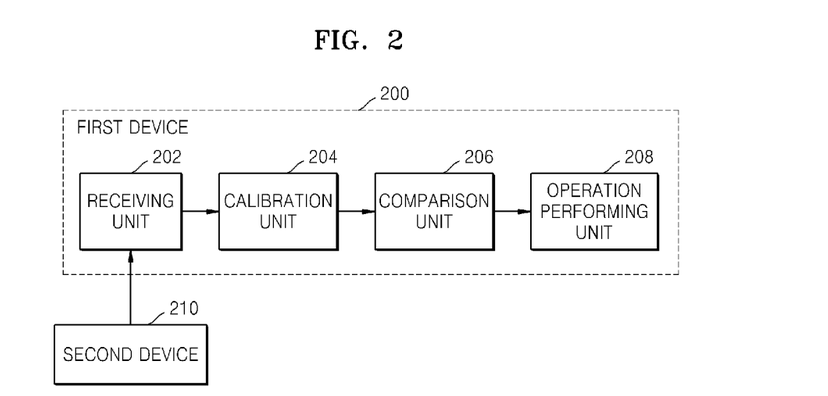
FIG. 2 is a diagram illustrating an operation performing apparatus which performs an operation related to a second device via near field communication according to an embodiment of the present invention.

FIG. 2 shows an operation performing apparatus 200 that performs an operation related to a second device 210 via near field communication according to an embodiment of the present invention. The operation performing apparatus 200, hereinafter referred to as a first device 200, includes a receiving unit 202, a calibration unit 204, a comparison unit 206, and an operation performing unit 208. According to other aspects of the invention, the first device 200 may include additional and/or different units. Similarly, the functionality of two or more of the above units may be integrated into a single component. For convenience of description, a second device 210 is also shown in FIG. 2.

The receiving unit 202 receives a signal for wireless communication from the second device 210. The signal for the wireless communication may be, for example, a Bluetooth signal or a Wireless Fidelity (Wi-Fi) signal. When the first device 200 receives the signal for the wireless communication from the second device 210, the first device 200 establishes a connection with the second device 210. According to other aspects of the present invention, the wireless communication may employ any wireless communication technology.

The calibration unit 204 calibrates the strength of the signal received via the receiving unit 204. The calibration of the strength of the signal may be performed by calibrating Received Signal Strength Indication (RSSI). uV/m, dBm, or other measurement units may be used as a unit of strength. The calibrated signal strength may be represented by a normalized value between 1 through 10. 1 may correspond to the weakest signal strength and 10 may correspond to the strongest signal strength. The comparison unit 206 compares the strength of the signal calibrated by the calibration unit 204 with operation signal information that is a result of calibrating a range of strengths of signals which are for wireless communication and which are received from the second device 210 moving between each of a plurality of points set within a predetermined distance from the first device 200.

The operation signal information is a value obtained by a user by sequentially positioning the second device 210 at the plurality of points and then calibrating the strength of the signals transmitted to the first device 200 from the second device 210 when positioned at each of the plurality of points. The operation signal information may also be a result of calibrating the range of the strengths of the signals. A reason for determining the calibration result using, not signal strength, but the range, is that even when the second device 210 remains positioned at a same point, the strength of the signals received from the second device 210 may be differentiated according to time.

The operation signal information is the value that is predetermined by the user via the above-described procedure. As described above, the plurality of points may be determined by the user, and the reason for determining the plurality of points by the user is to enable the first device 200 to perform an operation related to the second device 210 when the second device 210 enters a zone between the first device 200 and the plurality of points. The zone between the first device 200 and the plurality of points is referred to as an operation zone, and the plurality of points are referred to as boundary points. When the second device 210 is positioned in the operation zone, the operation zone may be defined as the zone in which a signal, which has strength within the range of the strengths of the signals transmitted from the second device 210 existing within the boundary points, may be received. Thus, the operation zone may be configured with the boundary points and other points adjacent to the boundary points. A detailed description regarding the operation zone and the operation signal information will be described later in relation to FIGS. 3 through 5.

As a result of the comparison performed by the comparison unit 206, the operation performing unit 208 selectively performs the operation related to the second device 210. The operation performing unit 208 performs the operation related to the second device 210 only when the strength of the signal calibrated by the calibration unit 204 is within the range of the strengths of the signals included in the operation signal information. This is because, in such a case, the second device 210 is determined to exist within the operation zone.

The operation related to the second device 210 may be an operation that is pre-set in the first device 200 by the user, according to the type of the second device 210. For example, the operation performed by the operation performing unit 208 may be at least one of content reception/transmission, content output, and data synchronization. For example, when the first device 200 is a notebook and the second device 210 is an MPEG-1 Audio Layer 3 (MP3) player, if the strength of a signal received from the MP3 player is within the range of the strengths of the signals included in the operation signal information, the notebook may receive an MP3 file which is currently being reproduced in the MP3 player, thereby outputting the MP3 file via a speaker of the notebook.

Figure 3:
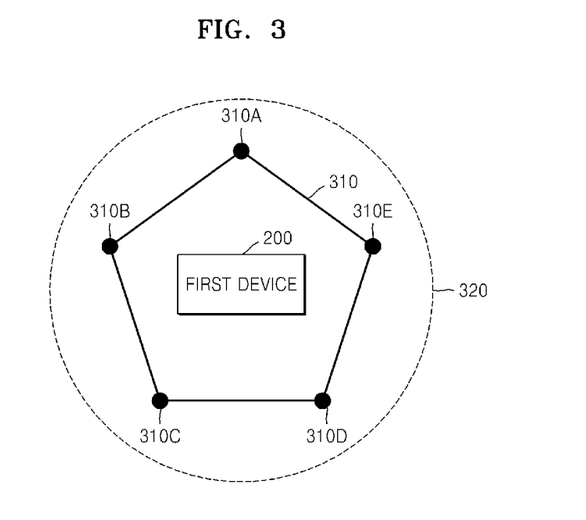
FIG. 3 is a diagram illustrating an operation zone according to another embodiment of the present invention.

FIG. 3 shows an operation zone 310 according to another embodiment of the present invention. The operation zone 310 is shown in the form of a pentagon formed by connecting 5 boundary points 310A, 310B, 310C, 310D, and 310E with straight lines, with the first device 200 centered therein. A communication enabled zone 320 is also illustrated.

As shown in FIG. 3, for convenience of description, the operation zone 310 has the shape of a pentagon. However, the shape of the operation zone 310 is not limited thereto but may be formed to include all available points in which a signal, that has a strength within a range of strengths of signals received from another device existing at boundary points, can be received. The shape of the operation zone 310, according to some aspects of the present invention, may correspond to the position of the boundary points.

When the first device 200 determines that the second device 210 has entered the pentagon-shaped operation zone 310 as shown in FIG. 3, where the strength of a signal received from the second device 210 is determined to be within the range of the strengths of the signals included in the operation signal information, the first device 200 performs the operation related to the second device 210.

However, when the second device 210 does not enter the operation zone 310 but only enters the communication enabled zone 320, that is, in the case where the signal is received from the second device 210 but the strength of the received signal is outside the range of the strengths of the signals included in the operation signal information, the first device 200 does not perform the operation related to the second device 210.

Figure 4:
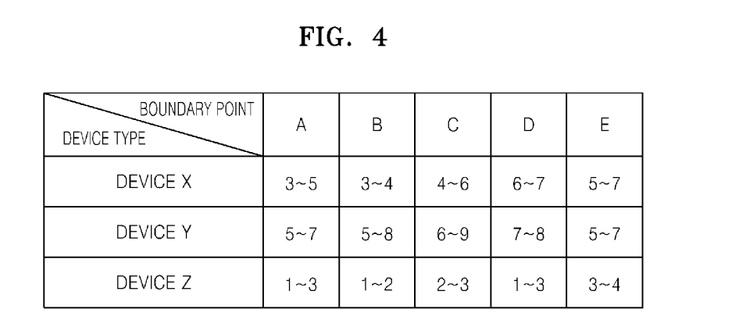
FIG. 4 is a table illustrating an example of operation signal information according to another embodiment of the present invention.

FIG. 4 is a table showing an example of operation signal information according to another embodiment of the present invention. Ranges of strengths of signals received from various types of the second device 210, which are a device X, a device Y, and a device Z moving between each of boundary points A, B, C, D, and E are shown in FIG. 4. Each of the ranges is represented by a normalized value between a minimum value 1 and a maximum value 10.

For example, referring to FIG. 4, a signal having a strength in a range of 3 through 5 is received from the device X at the boundary point A, a signal having a strength in a range of 3 through 4 is received from the device X at the boundary point B, a signal having a strength in a range of 4 through 6 is received from the device X at the boundary point C, a signal having a strength in a range of 6 through 7 is received from the device X at the boundary point D, and a signal having a strength in a range of 5 through 7 is received from the device X at the boundary point D.

According to other aspects of the present invention, the operation signal information may not include all of the ranges of the strengths of the signals received from the second device 210 moving between each of the boundary points A, B, C, D, and E as shown in FIG. 4, but may include only a range of signal strengths of each device, wherein the range includes a minimum value and a maximum value of the signal strength. For example, as shown in FIG. 4, the operation signal information may include information informing a user that the device X has a signal strength in a range of 3 through 7, the device Y has a signal strength in a range of 5 through 9, and the device Z has a signal strength in a range of 1 through 4.

As shown in FIG. 4, when the first device 200 receives a signal having the strength in the range of 3 through 7 from the device X, the first device 200 determines that the device X has entered an operation zone and thereby performs an operation related to the device X. When the first device 200 receives a signal having the strength in the range of 5 through 9 from the device Y or receives a signal having the strength in the range of 1 through 4 from the device Z, the first device 200 performs operations related to each of the devices Y and Z. According to some aspects of the present invention, a user may newly generate the operation signal information whenever desired.

Figure 5:
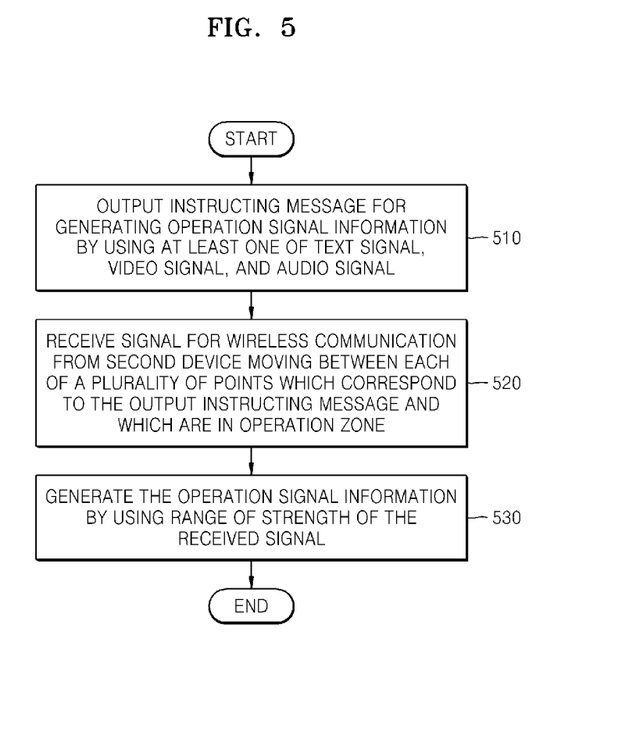
FIG. 5 is a flowchart of a method of generating operation signal information, according to an embodiment of the present invention.

FIG. 5 is a flowchart of a process of generating operation signal information, according to an embodiment of the present invention. In operation 510, an instructing message may be output using at least one of a test signal, a video signal, and/or an audio signal. For example, if the first device 200 is a notebook, an image in which a device is positioned in front of the notebook may be graphically represented on a screen of the notebook with text such as "Please position a device at a desired place in front of the notebook". A voice corresponding to the text may also be output via an audio signal.

In operation 520, a signal for wireless communication is received from the second device 210 moving between each of a plurality of points which correspond to the output instructing message. For example, when the instructing message requiring the device (such as an MP3 player) to be sequentially positioned at predetermined points of front, rear, left, and right directions is sequentially output according to a predetermined temporal interval, a user may sequentially position the MP3 player at the predetermined points of front, rear, left, and right directions according to when each of the instructing messages is output. The notebook then receives a signal from the MP3 player existing at each of the predetermined points.

The user may consider at which point the MP3 player is positioned so that the notebook can reproduce an MP3 file of the MP3 player, and may determine a plurality of points. If the user desires the notebook to reproduce the MP3 file of the MP3 player only when the MP3 player is very close to the notebook, the user can determine the plurality of points as points which are close to the notebook and, if the user desires the notebook to reproduce the MP3 file of the MP3 player only when the MP3 player is far from the notebook, the user can determine the plurality of points as points which are far from the notebook.

In operation 530, the operation signal information is generated using a range of strength of a received signal. For example, in the case where the signal is received, wherein the signal respectively has the strength in a range of 3 through 5, 3 through 4, 4 through 6, 6 through 7, and 5 through 7 when the device X respectively moves between each of the boundary points A, B, C, D, and E, the operation signal information may be generated as shown in FIG. 4.

The first device 200 may further include an information generation unit (not shown) which generates the operation signal information. The information generation unit may comprise an output unit (not shown) which outputs the instructing message for generating the operation signal information, and a generation unit (not shown) which generates the operation signal information by using the range of strength of the signal received from the second device 210.

The operation signal information may be updated in every predetermined period. Unlike the generation of the operation signal information described above, the update of the operation signal information does not change all of the operation signal information but only sets the range of strength of the signal to a new range.

A procedure for updating the operation signal information regarding the device X will now be described with a corresponding example referring to FIG. 4. First, while the first device 200 performs the operation related to the device X, the first device 200 also calibrates the strength of the signal received from the device X. The first device 200 stores a range of strength of such a calibrated signal as a sample.

In this manner, the first device 200 stores a plurality of samples and performs the update using the stored plurality of samples when the number of the stored plurality of samples exceeds a predetermined number. For example, when the number of the stored plurality of samples exceeds 50, the first device 200 may update the operation signal information using the stored plurality of samples.

Since a range of strength of a signal of each sample varies, a standard for updating the range of strengths of the signals included in the operation signal information may be necessary. According to aspects of the present invention, the range of strength of the signal to be updated may be determined according to a ratio of the number of samples having a range greater than the range of strength of the signal included in the operation signal information to the total number of the plurality of samples, or according to a ratio of the number of samples having a range smaller than the range of strength of the signal included in the operation signal information to the total number of the plurality of samples.

For example, the range of strength of the signal of the device X is 3 through 7 in FIG. 4, and if the ratio of the number of the samples having a range of strength of 8 through 9 to a total of 50 samples is approximately 80%, the range of strength of the signal of the device X may be updated to a range of 3 through 9. When the first device 200 receives a signal having the range of strength of 3 through 9 from the device X, the first device 200 performs the operation related to the device X.

If the ratio of the number of samples having a range of strength of 4 through 6 to the 50 total samples is approximately 80%, the range of strength of the signal of the device X may be updated to a range of 4 through 6. In this case, the first device 200 performs the operation related to the device X only when the first device 200 receives a signal having the range of strength of 4 through 6. The ratio related to the number of samples may vary according to different embodiments of the present invention.

The operation performing unit 208 may further include an update unit (not shown) for updating the operation signal information.

Figure 6:
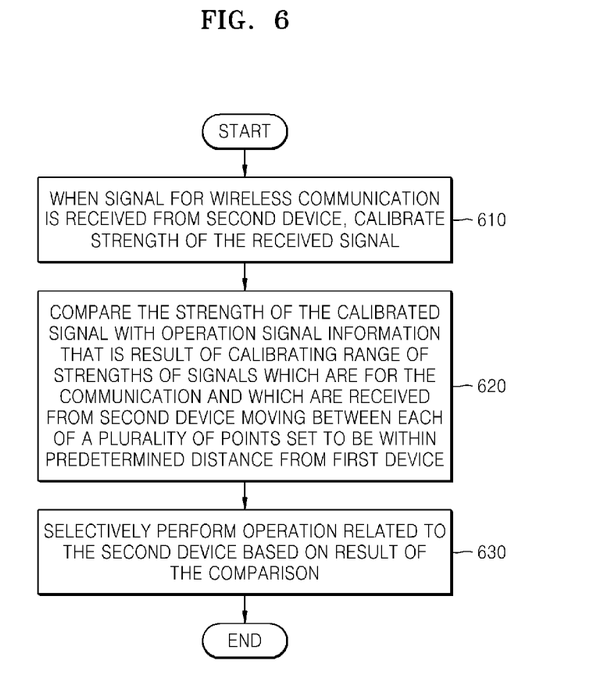
FIG. 6 is a flowchart of a method of performing an operation related to a second device, performed by a first device, via near field wireless communication, according to another embodiment of the present invention.

FIG. 6 is a flowchart of a process of performing an operation related to a second device, performed by a first device, via near field wireless communication, according to another embodiment of the present invention. In operation 610, when a signal for wireless communication is received from the second device, a strength of the received signal is calibrated. In operation 620, the strength of the calibrated signal is compared with operation signal information that is a result of calibrating a range of strengths of signals which are for wireless communication and which are received from the second device moving between each of a plurality of points set to be within a predetermined distance from the first device. In operation 630, as a result of the comparison, the operation related to the second device is selectively performed.

Aspects of the present invention relate to a method of performing an operation related to a second device, performed by a first device, via near field wireless communication. When a signal for the wireless communication is received from the second device, aspects of the present invention calibrate the strength of the received signal; compare the strength of the calibrated signal with the operation signal information that is a result of calibrating the range of the strengths of the signals which are for the wireless communication and which are received from the second device moving between each of the plurality of points set to be within the predetermined distance from the first device; and as the result of the comparison, selectively perform the operation related to the second device. By doing so, the operation related to the second device can be selectively performed, based on a user's intentions.

Aspects of the present invention can be written as computer programs and can be implemented in general-use digital computers that execute the programs by using a computer readable recording medium. Examples of the computer readable recording medium include magnetic storage media (e.g., ROM, floppy disks, hard disks, etc.), and optical recording media (e.g., CDs, or DVDs).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing an operation related to a second device, performed by a first device, via near field wireless communication, the method comprising:
   calibrating a strength of the received signal when a signal for wireless communication is received from the second device;
   comparing the strength of the calibrated signal with operation signal information that is a result of calibrating a range of strengths of signals which are for the wireless communication and which are received from the second device moving between a plurality of points set to be within a predetermined distance from the first device; and
   selectively performing the operation related to the second device, based on a result of the comparison.

2. The method of claim 1, further comprising updating the operation signal information, wherein the updating comprises:
   storing a range of strength of the signal, which is for the wireless communication and which is received from the second device, as a sample while performing the operation; and
   when the number of the stored sample exceeds a predetermined number, updating the operation signal information using the ranges of the strengths of the signals in the samples.

3. The method of claim 2, wherein, when a ratio of a number of samples having a range greater than the range of the strengths of the signals comprised in the operation signal information to a total number of the stored samples exceeds a predetermined ratio, the updating of the operation signal information comprises expanding the range of the strengths of the signals in the operation signal information using the range of strength of a signal in the samples.

4. The method of claim 2, wherein, when a ratio of a number of samples having a range smaller than the range of the strengths of the signals in the operation signal information to a total number of the stored sample exceeds a predetermined ratio, the updating of the operation signal information comprises reducing the range of the strengths of the signals in the operation signal information using the range of strength of a signal in the samples.

5. The method of claim 1, further comprising generating the operation signal information, wherein the generating of the operation signal information comprises:
   outputting an instructing message to generate the operation signal information using at least one of a text signal, a video signal, and/or an audio signal;
   receiving a signal for wireless communication from the second device moving between each of a plurality of points corresponding to the output instructing message; and
   generating the operation signal information using a range of strength of the received signal.

6. The method of claim 5, wherein the plurality of points are determined according to a user's intentions.

7. The method of claim 1, wherein:
   the operation signal information further comprises information regarding a type of the second device which has transmitted the signal; and
   the operation signal information is generated using ranges of strengths of signals received from different types of the second device moving between each of the plurality of points.

8. The method of claim 1, wherein:
   the selective performing of the operation comprises performing the operation when the strength of the calibrated signal is within the range of the strengths of the signals in the operation signal information; and
   the operation comprises at least one of content reception/transmission, content output, and data synchronization.

9. The method of claim 1, wherein the signal for the wireless communication is a Bluetooth signal or a Wi-Fi signal.

10. An apparatus to perform an operation related to a second device, performed by a first device, via near field wireless communication, the apparatus comprising:
   a receiving unit to receive a signal for wireless communication from the second device;
   a calibration unit to calibrate a strength of the received signal; a comparison unit to compare the strength of the calibrated signal with operation signal information that is a result of calibrating a range of strengths of signals which are for the wireless communication and which are received from the second device moving between each of a plurality of points set to be within a predetermined distance from the first device; and
   an operation performing unit to selectively perform the operation related to the second device, based on a result of the comparison.

11. The apparatus of claim 10, further comprising:
   an update unit to update the operation signal information;
   wherein the update unit stores a range of strength of the signal, which is for the wireless communication and which is received from the second device, as a sample while the operation is performed, and when the number of the stored samples exceeds a predetermined number, updates the operation signal information using the ranges of the strengths of the signals in the samples.

12. The apparatus of claim 11, wherein, when a ratio of a number of samples having a range greater than the range of the strengths of the signals in the operation signal information to a total number of the stored samples exceeds a predetermined ratio, the update unit expands the range of the strength of the signals in the operation signal information using the range of strength of the signal in the samples.

13. The apparatus of claim 11, wherein, when a ratio of a number of samples having a range smaller than the range of the strength of the signals in the operation signal information to a total number of the stored samples exceeds a predetermined ratio, the update unit reduces the range of the strengths of the signals in the operation signal information using the range of strength of the signal in the samples.

14. The apparatus of claim 10, further comprising an information generation unit generating the operation signal information, wherein the information generation unit comprises:
   an output unit to output an instructing message to generate the operation signal information using at least one of a text signal, a video signal, and/or an audio signal; and
   a generation unit to generate the operation signal information using a range of strength of a received signal when the receiving unit receives the signal for wireless communication from the second device moving between each of a plurality of points corresponding to the output instructing message.

15. The apparatus of claim 14, wherein the plurality of points are determined according to a user's intentions.

16. The apparatus of claim 10, wherein:
   the operation signal information further comprises information regarding a type of the second device which has transmitted the signal; and the generation unit generates the operation signal information using ranges of strengths of signals received from different types of the second device existing at the plurality of points.

17. The apparatus of claim 10, wherein:
the operation performing unit performs the operation when the strength of the calibrated signal is within the range of the strengths of the signals in the operation signal information; and
the operation comprises at least one of content reception/transmission, content output, and data synchronization.

18. The apparatus of claim 10, wherein the signal for the wireless communication is a Bluetooth signal or a Wi-Fi signal.

19. A computer readable recording medium having recorded thereon a program to execute the method of claim 1.

20. A method of performing a predetermined operation in a first device, the method comprising:
calibrating the strength of a signal received from a second device;
determining whether the second device has entered an operation zone defined by a plurality of boundary points, based on whether the calibrated strength of the received signal is within a predetermined range of calibrated strengths of signals received from the second device while the second device is in the operation zone; and
performing a predetermined operation when the second device is determined to be in the operation zone.

21. The method of claim 20, wherein the determining further comprises:
comparing the strength of the calibrated signal with operation signal information that is a result of calibrating the range of strengths of signals received from the second device while the second device is in the operation zone; and
determining whether the second device has entered the operation zone based on the result of the comparison.

22. The method of claim 20, further comprising: refraining from performing the predetermined operation when the second device is determined not to be in the operation zone.

* * * * *